March 3, 1936.    E. H. SCHWEERING    2,032,504
CLUTCH AND BRAKE OPERATING MECHANISM
Filed May 29, 1933    2 Sheets-Sheet 1

ERNEST H. SCHWEERING.
INVENTOR.

BY James R Cole
ATTORNEYS.

March 3, 1936.  E. H. SCHWEERING  2,032,504
CLUTCH AND BRAKE OPERATING MECHANISM
Filed May 29, 1933   2 Sheets-Sheet 2

Ernest H. Schweering
*Inventor:*
By James R. Cole
Attorney

Patented Mar. 3, 1936

2,032,504

UNITED STATES PATENT OFFICE 2,032,504

CLUTCH AND BRAKE OPERATING MECHANISM

Ernest H. Schweering, Tulsa, Okla.

Application May 29, 1933, Serial No. 673,396

8 Claims. (Cl. 192—.01)

My invention relates to new and useful improvements in clutch and brake operating mechanism for automobiles employing automatic clutches and has for its object to provide means of facilitating the brake control and also the clutch control, and of providing safety means for their operation, as will more particularly hereafter appear.

When a conventional vacuum operated clutch is controlled through the operation of the gas throttle mechanism such as the accelerator, the clutch automatically engages when the throttle is opened and automatically disengages when the throttle is closed. This arrangement does not permit of a flexible control of gas feed, clutch operation and brake action, all of which are necessarily related in the control of the automobile and usually are interrelated and more or less coacting in the manipulation of its control mechanism. In the accomplishment of my object I have provided a brake controlled means of operatively disconnecting the clutch from the gas throttle mechanism; provided for a manual operation of the clutch even when it is under automatic control of the gas throttle mechanism; and also provided for a manual operation of both clutch and brake coacting, either when the clutch is under said automatic control or when it is not subject thereto, and in so doing have utilized my device for operating brake and clutch as disclosed in my application for Letters Patent filed July 11, 1932, and now pending under Serial No. 621,814; combined the service brake pedal with the clutch pedal as is also disclosed in said application; utilized the second conventional pedal as a brake pedal which may be used either as an emergency brake pedal taking the place of the hand lever emergency brake or as a service brake, also arranged to permit either one or both pedal brakes to be operated by power if desired; and provided means whereby the brake used as an emergency may be set and locked.

With the above and other objects in view which will appear as the description proceeds, my invention consists in the novel features hereafter set forth in detail, illustrated in the accompanying drawings and more particularly pointed out in the appended claims.

Referring to the drawings in which numerals of like character designate similar parts throughout the several views.

Figure 1:
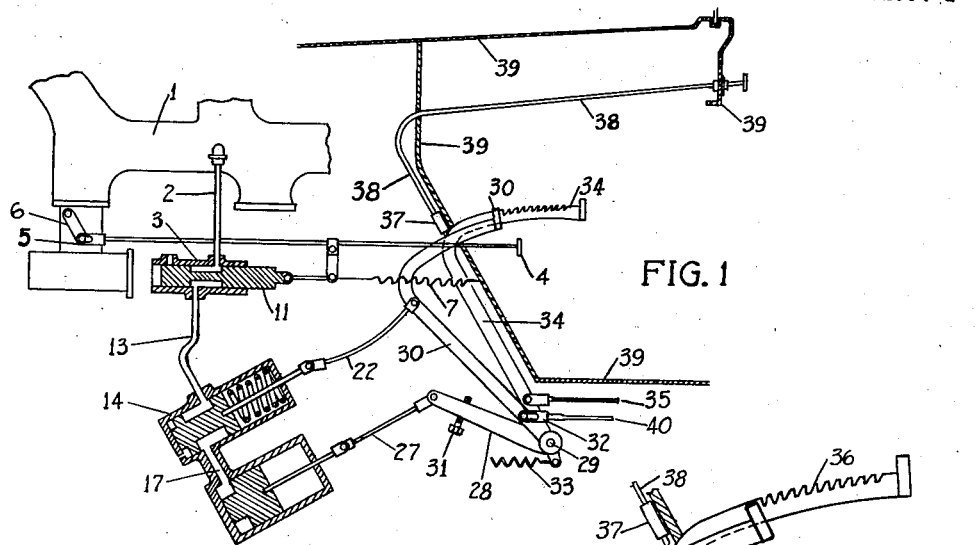
Fig. 1 is a combined diagrammatic view, partly in side elevation and partly in cross-section of my device and arrangement, showing brake and clutch levers, lever locking mechanism, clutch operating mechanism both for automatic and for manual operation, and brake operating mechanism, with the automatic vacuum operated parts connected into the intake manifold of the gas engine.
Figure 2:
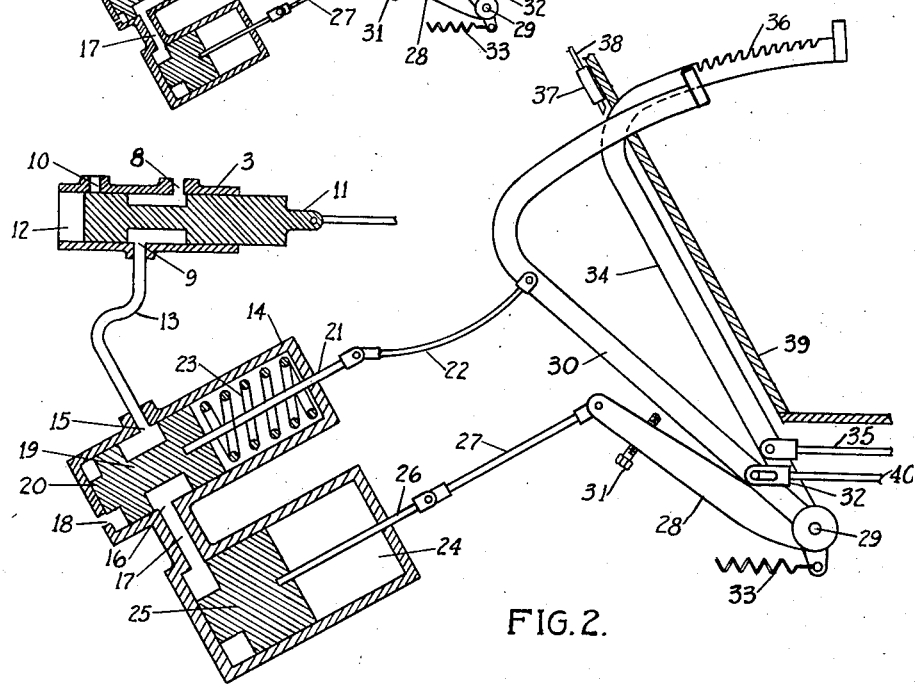
Fig. 2 is a view partly in side elevation and partly in cross-section, of my arrangement of levers, connections and valves.
Figure 3:
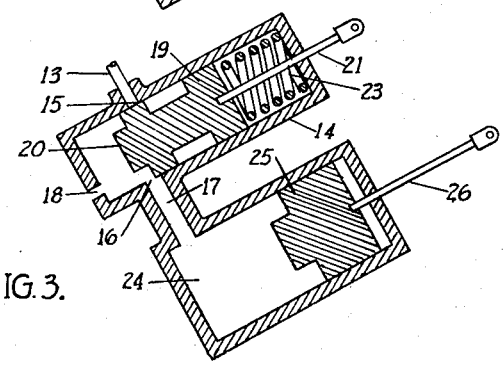

Fig. 3 is a view in cross-section of my cut-off and relief valve connected into the vacuum chamber or cylinder of the clutch operating piston and which cut-off and relief valve is connected to and operated through one of the pedals, and is interposed in the vacuum line between the valve operated by the gas throttle and the vacuum chamber of the clutch operating piston, as indicated in Fig. 2 and fully shown in Fig. 1.

Figure 4:
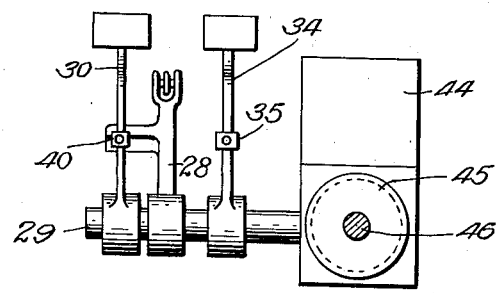

Fig. 4 is a view in front elevation of the clutch and brake levers, with the clutch indicated.

Figure 5:
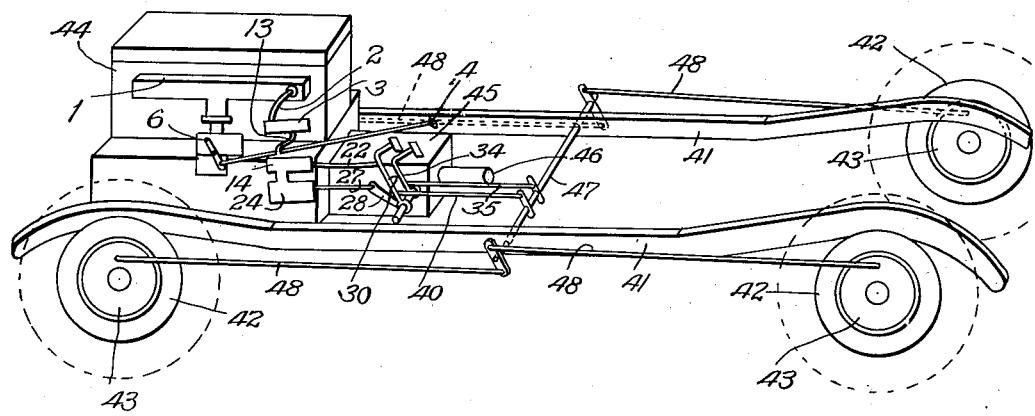

Fig. 5 is a diagrammatic view in perspective of an automobile with engine, clutch, brakes, clutch and brake operating mechanism, including my invention.

Directing attention particularly to Figs. 1 to 4 inclusive, of the drawings, 1 represents the intake manifold of a gas engine, not shown, in an automobile, likewise not shown; 2 a vacuum line connected into said manifold and leading to valve 3 which is rigidly connected with and operated by the foot accelerator 4 connected by slide link 5 to bell crank 6 operating the gas intake valve or throttle of the engine, not shown, and drawback spring 7, all of which are of the conventional type. Valve 3 is of the sliding spool type with port 8 connected into the vacuum line running to the manifold and port 9 connected into the vacuum line running to the clutch operating piston chamber hereafter mentioned, and port 10 a relief through which air may enter to relieve the vacuum in the mechanism. The valve proper or moving part or stop of valve 3 is indicated by numeral 11. The body of valve 3 is open at the end as at 12. The position of ports 8, 9 and 10 of valve 3 with relation to the passageway contained in the valve proper 11 is arranged to function in manner to cause ports 8 and 9 to be in communication when foot accelerator 4 is released, and to cause ports 9 and 10 to be in communication when foot accelerator 4 is pressed in to open the gas throttle, all arranged in the usual manner.

In the present conventional practice, port 9 would be directly connected with the chamber of the clutch operating piston but I interpose between the two a cut-off and relief valve preferably actuated through one of the brake pedals, all of which will be hereafter explained in detail, and which cut-off and relief valve will be referred to and designated as the control valve.

A vacuum line 13 leads from port 9 to my control valve, which is of the sliding spool type and is designated in general by numeral 14, and said line is connected into said valve through port 15. Port 16 of my control valve 14 leads to duct 17 communicating with the chamber of the clutch operating piston. Valve 14 also has a relief port or vent 18. The valve proper or moving part or stop of my control valve 14 is designated by numeral 19 and is of sliding spool type construction as aforesaid operating in a cylindrical valve chamber into which ports 15, 16 and 18 communicate as previously stated. The valve proper 19 has thereon a limit stop 20 and a valve stem 21 which is operatively connected by cable 22, or other flexible linkage, preferably to the brake and clutch operating pedal, as will later be explained. A compression spring 23 in said valve 14 is adapted to urge the valve proper 19, against its limit stop 20, in which position valve proper 19 permits ports 15 and 16 to be in communication with each other. This urge, however, is resisted by drawback spring 33 of the brake and clutch pedal to which valve stem 21 is connected, so that when said pedal is resting in normal inoperative position the communication between ports 15 and 16 is obstructed as shown in Fig. 3 and in that position ports 16 and 18 are in communication with each other and spring 23 is under operating compression. Thus when the brake and clutch pedal to which valve stem 21 is connected is actuated sufficiently, the valve proper 19 is driven against its limit stop 20 and ports 15 and 16 are then in communication with each other as shown in Fig. 2.

Duct 17 leads into the chamber 24 of the piston 25 operating the clutch, not shown, and connected therewith through piston rod 26 and link 27 and clutch lever 28. The clutch lever 28 in turn is operatively connected with the clutch in the usual manner, not shown. The clutch lever 28 is arranged and adapted to coact with one of the brake levers as disclosed in my pending application previously mentioned, and preferably this brake lever is the same one which is adapted to operate the control valve 14.

Turning now from the consideration of the vacuum operating mechanism and directing our attention more particularly to the brake and clutch operating and operated levers, the drawings disclose three levers mounted in parallel on pivot member 29 with the two pedal levers rotatably mounted thereon and the clutch lever mounted rigidly with said member 29, all in the customary manner. Each of the three levers may be operated independent of either or both of the others.

The first to consider is lever or pedal 30, which is designed to act in the triple capacity of a manually operated brake lever, a manually operated clutch lever, and a manually operated lever for actuating control valve 14. Lever 30 will hereafter be referred to as the clutch-brake lever, or clutch and brake lever, and it preferably occupies the same position in the automobile as that now occupied by conventional clutch pedal. This lever is the one with which valve stem 21 of the control valve 14 is connected by cable 22, and in the drawings is shown in partial operation, sufficient to throw a slack in cable 22, thereby permitting spring 23 to move the slide valve 19 in position where ports 15 and 16 of valve 14 are in communication with each other, and yet not sufficient to apply the brakes, or possibly sufficient only to slightly apply the brakes. This lever also coacts with clutch lever 28, in that the adjustable screw 31 is positioned in the plane of the movement of lever 30, so that lever 30, after contacting bolt 31, may then with continued movement, actuate lever 28 to disengage the clutch operated by it in event the motor is not running or there is no power present to operate lever 28. Lever 30 is connected to brake rod 40 by link connection 32. The link connection 32 permits lever 30 to move forward sufficiently to throw control valve in position shown in Fig. 2 before its continued movement acts on the brakes, not shown, operated through brake rod 40. Because of the link 32 lever 30 is supplied with a drawback spring 33 wherewith it may be returned to its normal inoperative position when the clutch is engaged. Preferably the entire linkage is adjusted to cause such sequence of action.

The second lever to consider is the clutch lever 28 which operates the clutch, not shown, in the usual manner. It also has provision for engagement by lever 30, the same being screw 31 as previously explained. Otherwise than that, and but for its connection with link 27, the movement of lever 28 is independent of lever 30. It has no provision for manual operation except through lever 30.

When used as an emergency brake as in parking, provision is made for locking the brake through a conventional rack and pawl adapted to this use, and wherein the lever 34 is supplied with a rack 36 made up of a series of teeth adapted to receive and hold a spring actuated pawl 37 designed to be engaged in the rack and released thru the operation of a flexible rod or cable 38. 39 indicates a body portion of the automobile.

Directing attention more particularly to Fig. 5 of the drawings, 41 represents the frame of an automobile, 42 the wheel, 43 the brakes, 44 the engine, 45 the clutch, 46 the drive shaft, 47 the brake bar to which levers 30 and 34 are connected, and 48 the brake rods running from bar 47 to the brakes 43, all of which is of conventional design. It is obvious that the brake levers 30 and 34 instead of being connected to mechanical brakes as indicated, may be connected to hydraulic brakes, as either kind of brake may be operated with my device.

In operation with engine running and with both levers 30 and 34 normally at rest spring 33 will have returned lever 30 to its normal released position wherein link connection 32 is slack between lever 30 and rod 40, and the control valve 14 will be in the position shown in Fig. 3, wherein ports 16 and 18 are in communication with each other, piston chamber 24 will be at atmosphere, and the clutch will be engaged. In this position also, the screw 31 on the clutch lever 28 will be brought in close proximity to the clutch-brake lever 30 in which position lever 30 is adapted to actuate lever 28. The gas throttle may then be operated without affecting either clutch or brakes.

Under the same circumstance except with the engine dead the clutch and brake system may be manually operated through clutch-brake lever 30 and coacting clutch lever 28, for the movement of both of the levers is free from the vacuum operated mechanism, and the brake may be used or the clutch disengaged as desired.

However, with the engine running and with both levers 30 and 34 normally at rest as aforesaid, the operator may if desired permit a foot to ride or lightly rest on pedal 30 sufficiently to cause valve 14 to open the passageway between ports 15 and 16, without applying the brakes, for the link 32 is adapted to permit of such movement, whereupon the automatic clutch mechanism is free to be operated through the accelerator or gas throttle mechanism by means of which the clutch may be thrown in when the throttle is opened, and thrown out when the accelerator is in normal released position as shown in Fig. 1.

Furthermore, and still with the engine running and the clutch disengaged as aforesaid, the operator may remove his foot from lever 30 sufficiently to cause control valve to open the passageway between ports 16 and 18, thereby causing the clutch to become engaged, and at the same time release the pressure on the accelerator, or "take his foot off the gas" and step on brake pedal 34, by which action he has caused the car to be braked by its engine and also by the regular service brakes or the emergency brake, as the case may be. This arrangement also permits the use of automatic clutch mechanism when in heavy slow traffic with continual stops and starts, or when getting into or out of parking places.

Another situation which can be likewise handled with this arrangement is that of a dead engine or stalled car on a steep grade, in which case either both brakes may be used simultaneously or brake connected with lever 34 used together with the braking effect of the engine in gear.

Having thus fully disclosed my invention what I claim and desire to secure by Letters Patent is:

1. In an automatic vacuum-operated clutch mechanism for an automobile having a clutch lever and a brake lever and with said automatic vacuum operated clutch mechanism having therein a vacuum-line connected into a vacuum chamber wherein is a piston which is connected with said clutch lever by intermediate connections therewith and wherein there is a relief port, a valve in said vacuum line adapted to open and to close said line and also adapted to open said relief port in said vacuum chamber when said vacuum line is closed by said valve and adapted to close said relief port when said vacuum line is opened by said valve, means, coacting with said valve and with said brake lever, of holding said valve in normal position with said vacuum line closed thereby and with said relief port open when said brake lever is in normal inoperative position, and of actuating said valve to open said vacuum line and close said relief port when said brake lever is in operative position.

2. The combination of an automatic vacuum operated clutch mechanism in an automobile having a gas engine, a clutch, clutch lever, brake and brake lever, and with said mechanism having a vacuum line connected into the intake manifold of said gas engine, a gas throttle mechanism for said gas engine, a valve in said vacuum line connected with and controlled by the operation of said gas engine throttle mechanism, and with said mechanism also having a vacuum chamber wherein a piston for the clutch operating mechanism may be actuated by a vacuum in said chamber and with said piston connected with said clutch lever, all of the foregoing being of conventional design, a second valve in said vacuum line adapted to open and to close said vacuum line connection with said chamber and also adapted to open and to close a vent to said chamber, connecting means between said valve and said brake lever for actuating said valve through said brake lever to cause it to open said vent and close said vacuum line when said brake lever is in normal rest position, and means connected with said valve for actuating said valve when said brake lever is moved out of rest position to close said vent and to open said vacuum line.

3. The combination, as claimed in claim 2, and with said clutch lever positioned in relation to said brake lever and adapted to be manually actuated by the same to cause the clutch to become disengaged.

4. The combination, as claimed in claim 2, and with said clutch lever positioned in relation to said brake lever and adapted to be manually actuated by the same to cause the clutch to become disengaged, and a link slide connection between said brake lever and said brake.

5. The combination of an automatic vacuum operated clutch mechanism as claimed in claim 2 and a slide link connection between said brake lever and said brake.

6. In an automatic vacuum operated clutch mechanism for an automobile having a throttle mechanism, a clutch lever operatively connected to a clutch, and a brake lever operatively connected to a brake, and with said automatic vacuum operated clutch mechanism having therein a vacuum line connected into a vacuum chamber wherein is a piston which is connected with said clutch lever, and with a valve in said vacuum line adapted to be actuated by said throttle mechanism to open and to close said vacuum line and to vent the same, a combined cutoff and relief valve in said vacuum line arranged and adapted to close said vacuum line and to open said vent when said valve is in normal inoperative position and when said brake lever is also in normal inoperative position, and means of operatively connecting said last named valve with said brake lever.

7. In an automatic vacuum operated clutch mechanism for an automobile having a throttle mechanism, a clutch lever operatively connected to a clutch, and a brake lever operatively connected to a brake, and with said automatic vacuum operated clutch mechanism having therein a vacuum line connected into a vacuum chamber wherein is a piston which is connected with said clutch lever, and with a valve in said vacuum line adapted to be actuated by said throttle mechanism to open and to close said vacuum line and to vent the same, a combined cutoff and relief valve in said vacuum line adapted to normally close said vacuum line and to open said vent, linkage operatively connecting said valve with said brake lever and with said brake lever also arranged and adapted to engage and operate said clutch lever to cause said clutch to be disengaged.

8. In an automatic vacuum operated clutch mechanism, a clutch lever operatively connected to a clutch, and with said automatic vacuum operated clutch mechanism having therein a vacuum line connected into a vacuum chamber wherein is a piston which is connected with said clutch lever and with a valve in said vacuum line adapted to be actuated by a throttle mechanism to open and to close said vacuum line and to vent the same, a combined cutoff and relief valve in said vacuum line arranged and adapted to close said vacuum line and to open said vent when said valve is in normal inoperative position, an auxiliary lever adapted to manually engage said clutch lever, and linkage connecting said auxiliary lever with said combined cutoff and relief valve.

ERNEST H. SCHWEERING.